(12) United States Patent
Zeilinger

(10) Patent No.: US 9,533,840 B1
(45) Date of Patent: Jan. 3, 2017

(54) STACKER-RECLAIMER APPARATUS

(71) Applicant: FMW FOERDERANLAGEN GMBH, Kirchstetten (AT)

(72) Inventor: Franz Zeilinger, Asperhofen (AT)

(73) Assignee: FMW Foerderanlagen GmbH, Kirchstetten (AT)

( * ) Notice: Subject to any disclaimer, the term of this patent is extended or adjusted under 35 U.S.C. 154(b) by 0 days.

(21) Appl. No.: 14/810,750

(22) Filed: Jul. 28, 2015

(51) Int. Cl.
*B65G 65/02* (2006.01)
*B65G 65/28* (2006.01)
*B65G 65/22* (2006.01)
*B65G 41/00* (2006.01)

(52) U.S. Cl.
CPC ............ *B65G 65/28* (2013.01); *B65G 41/005* (2013.01); *B65G 65/22* (2013.01)

(58) Field of Classification Search
CPC ......... B65G 65/06; B65G 65/16; B65G 65/02; B65G 67/606
USPC ........... 198/508, 519, 507; 414/141.6, 141.8, 414/140.7, 142.7
See application file for complete search history.

(56) References Cited

U.S. PATENT DOCUMENTS

| | | | | | |
|---|---|---|---|---|---|
| 3,618,744 | A | * | 11/1971 | Hulette ................. | B65G 65/06 198/508 |
| 4,154,332 | A | * | 5/1979 | Schlegel ............... | B65G 65/06 198/507 |
| 4,244,463 | A | * | 1/1981 | Bartley ................. | B65G 65/06 198/508 |
| 4,363,396 | A | * | 12/1982 | Wolf ..................... | B65G 65/06 198/508 |
| 4,629,060 | A | * | 12/1986 | Schlegel ............... | B65G 65/28 198/508 |
| 7,226,011 | B2 | | 6/2007 | Schlegel et al. | |
| 8,177,053 | B2 | | 5/2012 | Hood et al. | |
| 8,387,778 | B2 | * | 3/2013 | Kokko ................... | B65G 65/28 198/508 |

\* cited by examiner

*Primary Examiner* — James R Bidwell
(74) *Attorney, Agent, or Firm* — Collard & Roe, P.C.

(57) ABSTRACT

A stacker-reclaimer apparatus for handling bulk material at a storage site includes a central tower having a vertical axis, a stacker boom rotatably mounted to the central tower about the vertical axis thereof, a reclaimer boom rotatably mounted to the central tower about the vertical axis thereof independently of the stacker boom, a conveyor mounted on the reclaimer boom, the conveyor including a conveyor screw, a hoist for hoisting the reclaimer boom from a lower position to an upper position, and a control unit for hoisting the reclaimer boom from the lower position to the upper position simultaneously with rotating the reclaimer boom about the vertical axis of the central tower.

3 Claims, 8 Drawing Sheets

STACKER-RECLAIMER APPARATUS

BACKGROUND OF THE INVENTION

1. Field of the Invention

The present invention relates generally to stacker-reclaimer apparatus for handling bulk material at a storage site.

The present invention further relates to a method for handling bulk material at a storage site.

2. Description of the Related Art

Stacker-reclaimer apparatus are utilized for stacking and reclaiming bulk material, such as wood chips. Typically, such stacker-reclaimer devices employ a central tower to which a stacker boom and a reclaimer boom are mounted. The stacker boom deposits bulk material on the pile. The reclaimer boom is equipped with a conveyor for conveying the reclaimed material towards the central tower. From there, the material is discharged into a discharge or reclaim conveyor. The stacker boom and the reclaimer boom may be rotated about the vertical axis of the central tower.

One example for a known stacker reclaimer device is disclosed in U.S. Pat. No. 8,177,053. In this prior art, the reclaimer assembly has a stationary axis of rotation during reclaiming of material. For this purpose, the outer end of the reclaimer assembly is supported on a rail guide. A harrow extends upwardly and angularly away from the reclaimer assembly in contact with the face of the pile of bulk material, thereby enabling pushing or raking of material into a transfer chute in a pit below the central tower. The reclaimed material is then passed to an enclosed tubular air cushion conveyor outfeed.

It is a disadvantage of this device that a rail guide is required to support the reclaimer assembly during rotation about the vertical axis. Furthermore, supporting the central tower is intricate in this construction.

Another prior art stacker-reclaimer apparatus is shown in U.S. Pat. No. 7,226,011 B2. In this prior art, the reclaimer apparatus is made of a pivotal reclaim conveyor assembly mounted to a main platform. The pivotal reclaim conveyor assembly is made of at least one continuous chain loop around a head sprocket and around a tail sprocket, both sprockets mounted rotatably in bearings at opposite ends of the pivotal reclaim conveyor assembly. The pivotal reclaim conveyor assembly functions by transporting bulk material from the pile in a plurality of rakes, when the plurality of rakes is on the bottom of the continuous loop. The plurality of rakes along the bottom of the pivotal reclaim conveyor assembly will move bulk material during operation if the pivotal reclaim conveyor assembly is lowered an appropriate distance by means of a hoist, hoist cable parts and a boom yoke down into the pile of bulk material and will continue to move bulk material if the pivotal reclaim conveyor assembly is rotated or slewed in the horizontal plane by means of slewing drive and slewing drive chain.

A drawback of this construction is that the rakes on the pivotal reclaim conveyor are subject to significant wear and tear. Accordingly, maintenance costs are high. Furthermore, the pivotal reclaim conveyor carrying the rakes requires a massive body portion for mounting on the central tower. This puts a limit to the area of the storage site available for storing bulk material. Also, the known construction does not enable the reclaiming of bulk material according to the "first-in-first-out" principle. Another drawback of this prior art solution is that a shaping of the pile of bulk material is required during operation.

It is an object of the invention to alleviate at least some of the problems associated with the prior art stacker-reclaimer apparatus.

SUMMARY OF THE INVENTION

In a preferred embodiment, the present invention provides for a stacker-reclaimer apparatus for handling bulk material at a storage site comprising a central tower having a vertical axis, a stacker boom rotatably mounted to the central tower about the vertical axis thereof, a reclaimer boom rotatably mounted to the central tower about the vertical axis thereof independently of the stacker boom, a conveyer mounted on the reclaimer boom, the conveyer comprising a conveyor screw, a hoist for hoisting the reclaimer boom from a lower position to an upper position, a control unit for hoisting the reclaimer boom from the lower position to the upper position simultaneously with rotating the reclaimer boom about the vertical axis of the central tower.

In a preferred embodiment, the control unit is also arranged for lowering the reclaimer boom from the upper position simultaneously with rotating the reclaimer boom about the vertical axis of the central tower.

Preferably, the reclaimer boom is rotated in a first direction of rotation during hoisting the reclaimer boom and in a second direction during lowering the reclaimer boom, the second direction of rotation being opposite to the first direction of rotation.

Preferably, bulk material is reclaimed during the upward and the downward movement of the reclaimer boom. This means that the conveyor screw is rotated about its axis during hoisting and lowering of the reclaimer boom. After completion of the upward movement of the reclaimer boom, the reclaimer boom may be rotated by a comparatively small angle to bring the reclaimer boom in closer contact with the remaining pile of bulk material. Subsequently, the downward movement of the reclaimer boom may be initiated, while further bulk material is reclaimed from the slope of the pile of bulk material at the storage site. This procedure may be repeated until the entirety of the pile of bulk material is reclaimed from the storage site.

The apparatus of the present invention entails a number of advantages. First, the apparatus implements a "first in-first out" principle. Second, the bulk material is treated gently during reclaiming by operating the conveyor screw on the reclaimer boom. It is another advantage that the conveyor screw requires little maintenance. A further advantage is that a shaping of the pile of bulk material, as required in the prior art, may be dispensed with during the reclaiming process. In this way, interruptions during reclaiming may be minimized or avoided. Furthermore, it is advantageous that the reclaimer boom does not need to be supported on an outer rail guide, but may be cantilevered on the central tower.

In a preferred embodiment, the reclaimer boom is pivotable about a horizontal axis between the lower and the upper position by an angle of at least 40°. Preferably, the angle between the reclaimer boom and a horizontal layer is approximately 40° in the upper position. In this way, the reclaimer boom may be moved adjacent to and in contact with a side or lateral slope of the pile of bulk material from a bottom to a top region thereof. While moving the reclaimer boom along the slope of the pile, bulk material is reclaimed and conveyed towards the center tower with the conveyor screw. Preferably, bulk material is also reclaimed by means of the conveyor screw while lowering the reclaimer boom from the upper to the lower position.

In a preferred embodiment the hoist comprises a cable pull for pulling and lowering the reclaimer boom between a lower and an upper position. The cable pull can be of any conventional design known by the person skilled in the art. Preferably, the cable pull comprises cables and pulleys guiding the cables. By activating the cable pull in a first direction, the reclaimer boom may be lifted from the lower position to the upper position. For lowering the reclaimer boom, the cable pull is activated in a second, reverse direction.

In a preferred embodiment, the reclaimer boom has a first end mounted to the central tower and a second end opposite to the first end, the first end of the reclaimer boom in the lower position being arranged above the second end of the reclaimer boom. In this way, the reclaimer boom in the lower position extends downwards from the central tower outwards. This construction facilitates the transfer of bulk material at the central tower from the conveyor screw on the reclaimer boom to an outfeed conveyor for conveying the bulk material away from the storage site.

In a preferred embodiment the stacker boom is pivotably mounted about a horizontal axis on the central tower. Preferably, the stacker boom is pivotable by an angle of at least 30°, more preferably 35°, between a lowermost and an uppermost position. For example, the stacker boom may be pivoted to the uppermost position for passing the reclaimer boom underneath the stacker boom.

In a preferred embodiment, the apparatus comprises an outfeed conveyor being arranged above a ground of the storage site. Such above ground outfeed conveyor is used for obtaining a sector stacker-reclaimer apparatus. The region around the outfeed conveyor above ground is kept free of bulk material. The stacking and reclaiming operation preferably extends over at least 260°, more preferably over at least 270°, of a circular storage site when seen in top view. It is an advantage of this construction that an underground outfeed conveyor may be dispensed with.

A preferred method of reclaiming bulk material from a pile at a storage site comprises the steps of:

turning a reclaimer boom about a vertical axis of a central tower by a first angle in a first direction and, at the same time, hoisting the reclaimer boom from a lower position to an upper position, moving the reclaimer boom over a lateral slope of the pile at the storage site, reclaiming bulk material from the lateral slope of the pile, and conveying reclaimed bulk material in a longitudinal direction of the reclaimer boom.

In a preferred embodiment, the method further comprises the step of turning the reclaimer boom about the vertical axis of the central tower by a second angle in the first direction while the reclaimer boom is arranged in the upper position. Preferably, the second angle is smaller than the first angle.

In a preferred embodiment, the method further comprises the steps of turning the reclaimer boom about the vertical axis of the central tower by a third angle in a second direction opposite to the first direction, and, at the same time, lowering the reclaimer boom from the upper position to the lower position, moving the reclaimer boom over the lateral slope of the pile at the storage site, reclaiming bulk material from the lateral slope of the pile, and conveying reclaimed bulk material in a longitudinal direction of the reclaimer boom.

In this way, both the upward movement and the downward movement of the reclaimer boom are used for reclaiming bulk material from the pile at the storage site.

Preferably, the third angle is identical to the first angle. The first and third angle may be 90°.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF THE DRAWINGS

Figure 1:
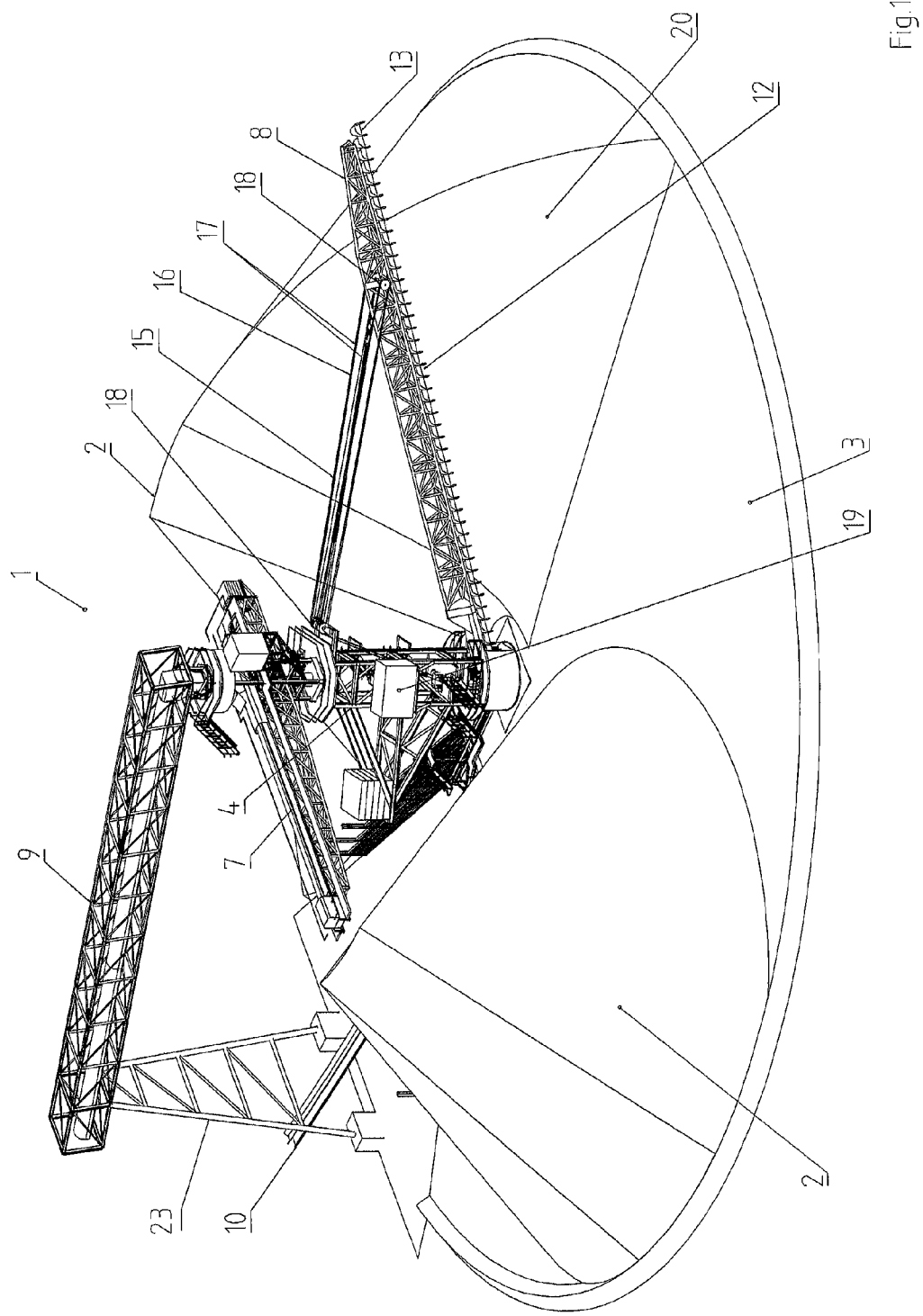
FIG. 1 is a view of a stacker-reclaimer apparatus according to a preferred embodiment of the invention.
Figure 6:
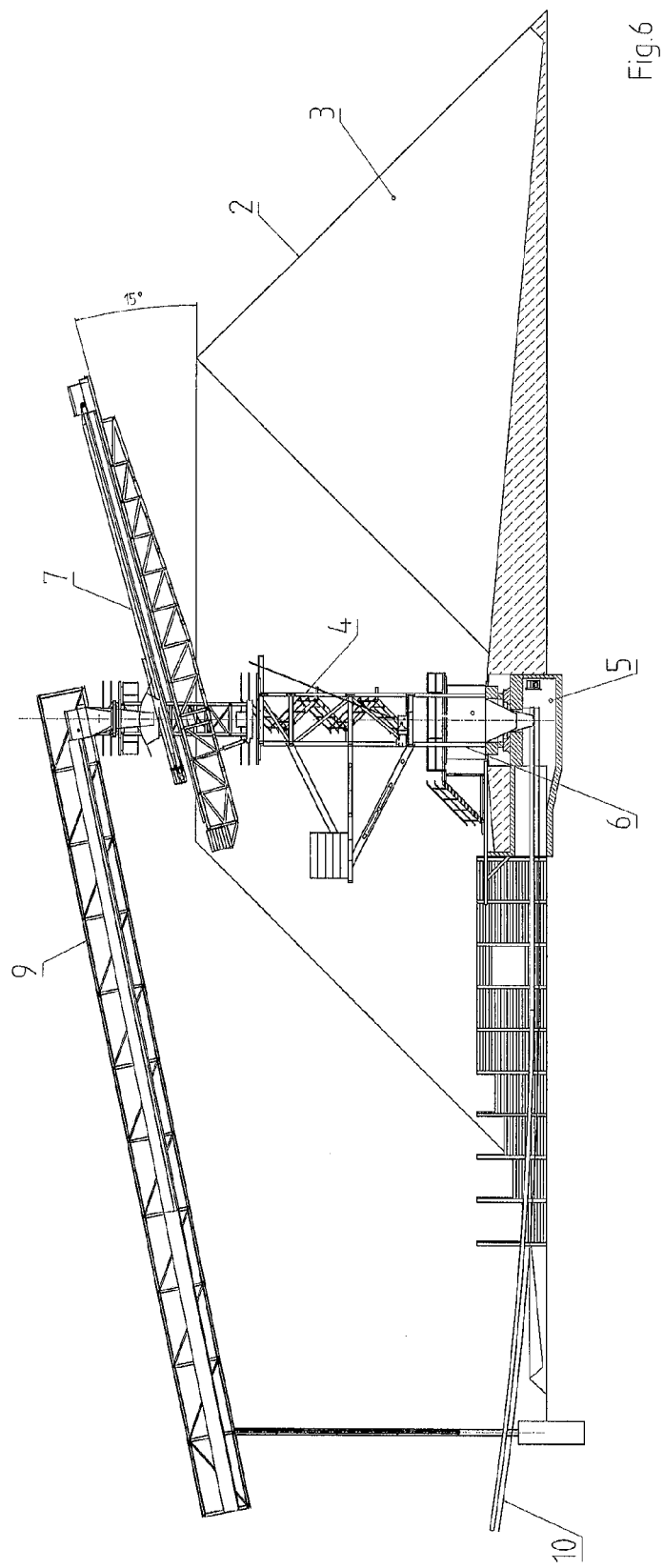
FIG. 6 is a view of the stacker-reclaimer apparatus of FIGS. 1 to 5, with a stacker boom in an upper position.

The drawings depict a preferred embodiment of a stacker-reclaimer apparatus 1 shown, for example, in FIG. 1, which is used for handling a pile of bulk material 2 at a substantially circular storage site 3. The stacker-reclaimer apparatus 1 comprises a central tower 4 having a vertical axis 5 (FIG. 6). Preferably, the vertical central tower 4 is arranged at the center of circular storage site 3. The central tower 4 may be constructed in any known manner and preferably comprises a scaffold 6 as shown in FIG. 6. A cantilevered stacker boom 7 is rotatably mounted to the central tower 4 about the vertical axis 5 thereof. For stacking bulk material 2 at the storage site 3, stacker boom 7 may turn about the vertical axis 5 of central tower 4. Stacker boom 7 may have a conveyor of any conventional construction for conveying bulk material 2 in the longitudinal direction of stacker boom 7. For example, stacker boom 7 may have a belt conveyer connected to a drive or an air-cushion conveyor as described in U.S. Pat. No. 8,177,053.

Apparatus 1 further comprises a cantilevered reclaimer boom 8 for reclaiming bulk material 2 from the pile at the storage site 3. Reclaimer boom 8 is rotatably mounted to the central tower 4 such that reclaimer boom 8 may turn about the vertical axis 5 of central tower 4 independently of the stacker boom 7.

Apparatus 1 further comprises an infeed conveyor 9 extending radially inwards from the periphery of storage site 3 to the center of the storage site 3. A first end of infeed conveyer 9 is supported on a scaffold 23 outside the storage site 3, wherein a second end of infeed conveyor 9 is supported on the upper end of central tower 4. The infeed conveyor 9 may include any known type of conveyor for conveying bulk material 2 to stacker boom 7, for example a belt conveyor or an air-cushion conveyor.

Figure 2:
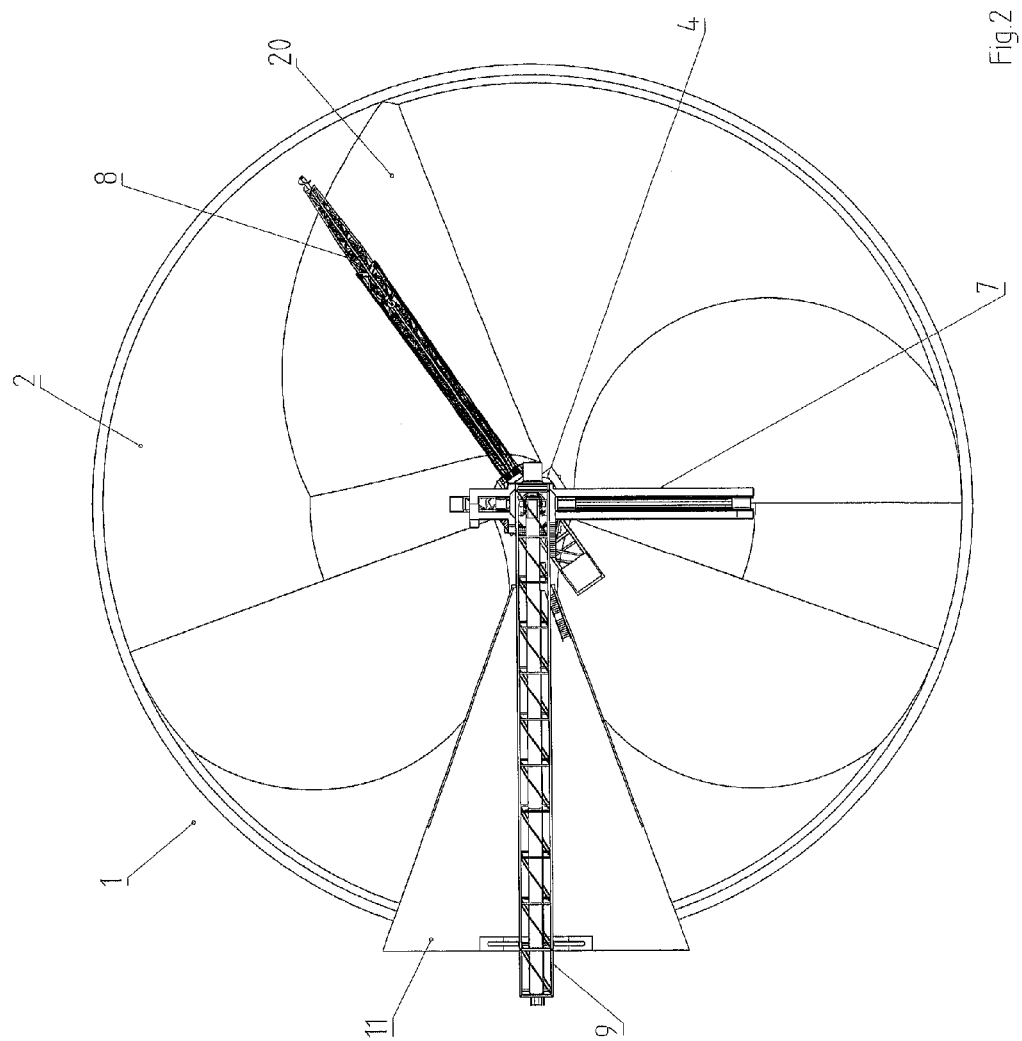
FIG. 2 is a top view of the stacker-reclaimer apparatus of FIG. 1.

Apparatus 1 further comprises an outfeed conveyor 10 for transporting bulk material collected with reclaimer boom 8 away from the center of storage site 3. The outfeed conveyor 10 may be of any known construction. In the shown embodiment, outfeed conveyor 10 is arranged above ground. Apparatus 1 thus constitutes a sector stacker-reclaimer, which means that the pile of bulk material 2 extends over less than 360° in top-view. In this way, a sector 11 (FIG. 2) of circular storage site 3 having the outfeed conveyor 10 is kept free of bulk material 2.

In the shown embodiment, a conveyor 12 extends in the longitudinal direction of reclaimer boom 8 over essentially the entire length thereof. The conveyor 12 comprises a conveyor screw 13 for conveying bulk material 2 from the pile at the storage site 3 towards the central tower 4.

Figure 3:
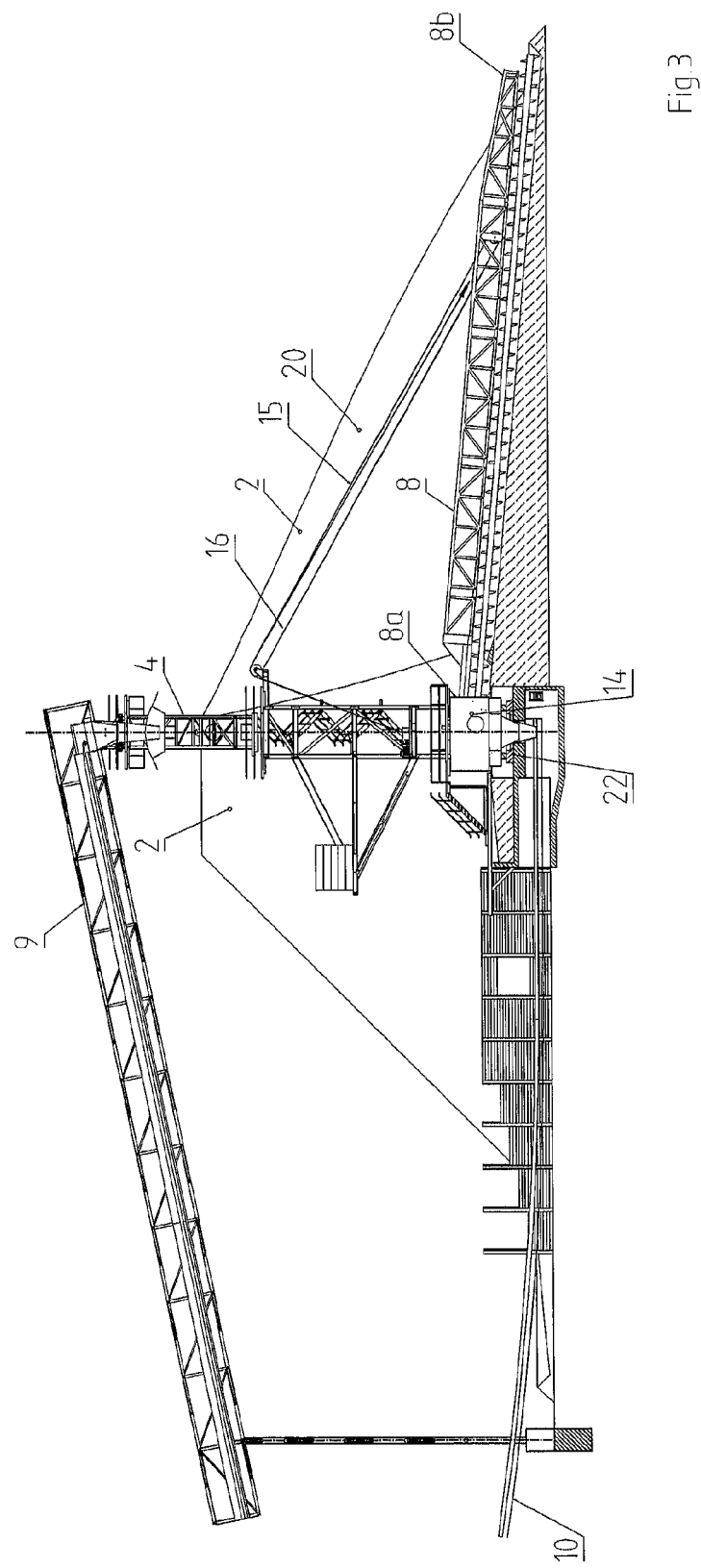
FIG. 3 is a view of the stacker-reclaimer apparatus of FIGS. 1 and 2, with a reclaimer boom in a lower position.
Figure 4:
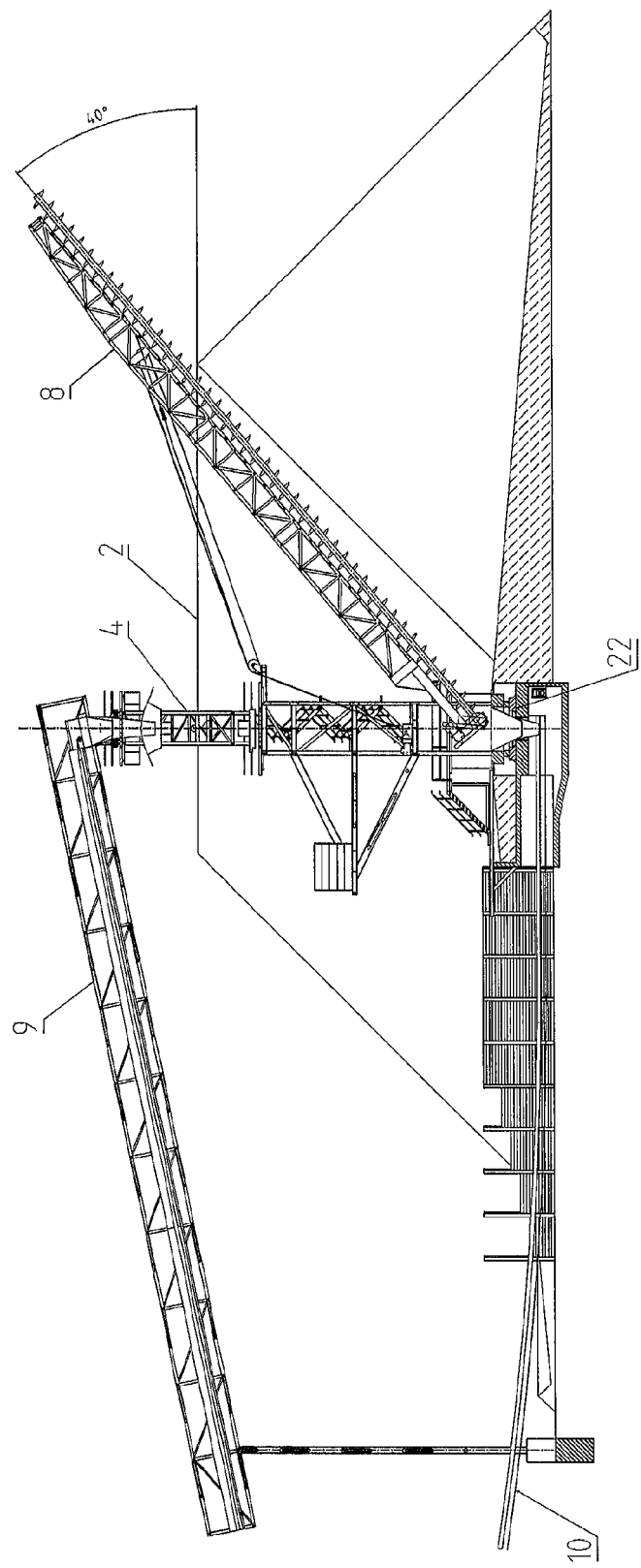
FIG. 4 is a view of the stacker-reclaimer apparatus of FIGS. 1 to 3, with the reclaimer boom in an upper position.
Figure 5:
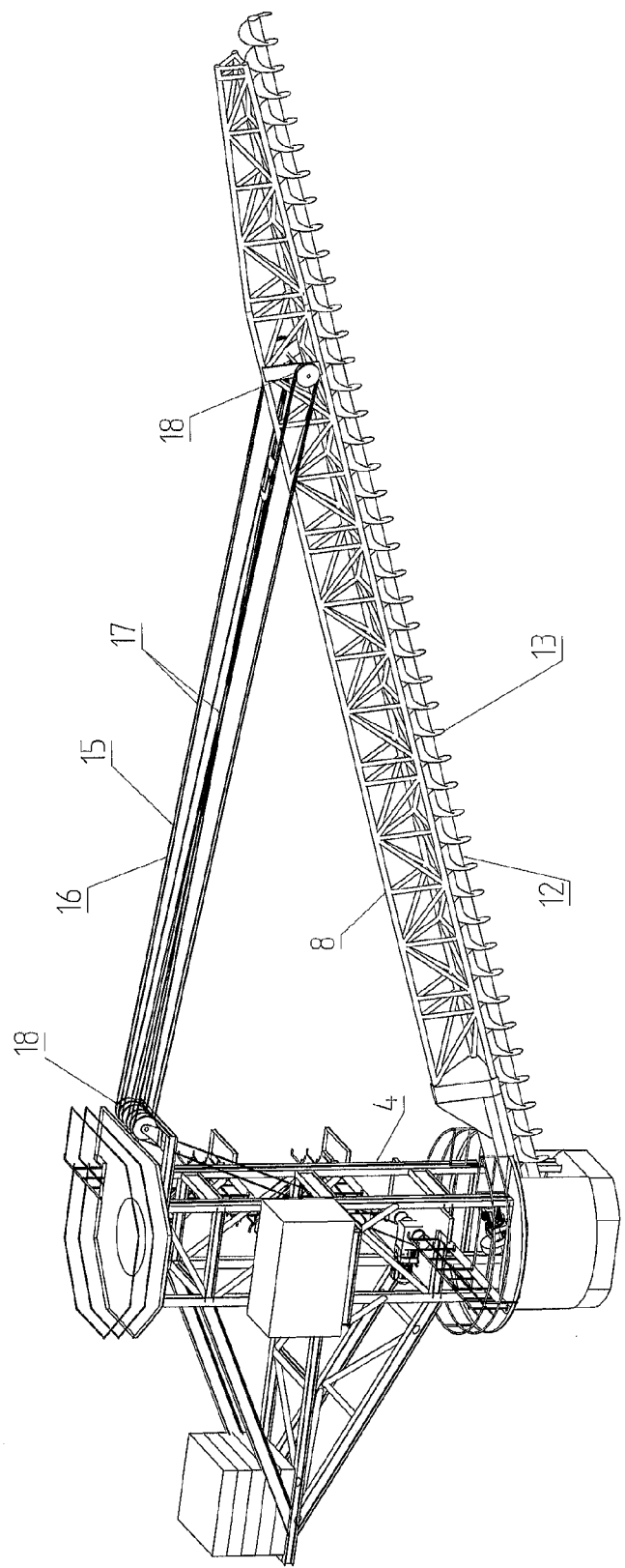
FIG. 5 is a partial view of the stacker-reclaimer apparatus of FIGS. 1 to 4 showing the mounting of the reclaimer boom on the central tower.

Referring to FIGS. 3 and 4, central tower 4 comprises a slewing bearing 22 for swiveling reclaimer boom 8 about the vertical axis 5 of central tower 4. In addition to this, reclaimer boom 8 is pivotably mounted about a horizontal axis 14 (see FIG. 3). In this way, the angle between the longitudinal axis of reclaimer boom 8 and vertical axis 5 of central tower 4 may be adjusted during reclaiming of bulk material 2. FIG. 3 depicts reclaimer boom 8 in its lowermost position, while FIG. 4 depicts reclaimer boom 8 in its uppermost position. In the uppermost position, reclaimer boom 8 extends upwardly from central tower 4 by an angle of at least 40° with respect to a horizontal layer. In the lowermost position, reclaimer boom 8 extends downwardly from central tower 4 by an angle of 4 to 6°, preferably 5°, with respect to a horizontal layer.

For moving reclaimer boom 8 between the lowermost and the uppermost position, going through a series of intermediary positions, a lifting mechanism or hoist 15 is provided. Hoist 15 comprises a cable pull 16 with cables 17 guided over pulleys 18. See FIG. 1. By activating cable pull 16, reclaimer boom 8 may be lifted from the lower position to the upper position. In a similar fashion, reclaimer boom 8 may be lowered from the upper position to the lower position by activating cable pull 16 in the reverse direction.

In a preferred embodiment, a control unit 19 controls the movement of reclaimer boom 8. In particular, control unit 19 is arranged for hoisting the reclaimer boom 8 from the lower position to the upper position at the same time with rotating the reclaimer boom 8 about the vertical axis 5 of the central tower 4 while reclaiming bulk material 2. In this way, reclaimer boom 8 moves in an inclined layer with respect to both a vertical and a horizontal layer when reclaiming bulk material 2 from a lateral slope 20 of the pile of bulk material 2. Preferably, the inclination of the upward and downward movement of reclaimer boom 8 is between 35° to 40° with respect to a horizontal layer.

In use, the following steps are followed in subsequent order to reclaim bulk material 2 from the pile at the storage site 3.

First, reclaimer boom 8 is turned about vertical axis 5 of central tower 4 by an angle of approximately 90° in a first direction. At the same time reclaimer boom 8 is lifted from its lower position to its upper position. During the upward movement of reclaimer boom 8, conveyor screw 13 is in contact with the inclined lateral slope 20 of the pile of bulk material 2. In this way, reclaimer boom 8 is moved over essentially the entire extension of lateral slope 20 of the pile of bulk material 2 at the storage site 3. Bulk material 2 is reclaimed from the lateral slope 20 of the pile and conveyed in the longitudinal direction of reclaimer boom 8 by means of conveyor screw 13.

Second, reclaimer boom 8 is rotated about vertical axis 5 by a second angle in the first direction of rotation, while reclaimer boom 8 is maintained in the upper position. Preferably, the second angle is significantly smaller than the first angle. In this way, the conveyor screw 13 penetrates into the surface of slope 20 of bulk material 2.

Third, reclaimer boom 8 is lowered from the upper position to the lower position, while the reclaimer boom 8 is rotated about vertical axis 5 in the second direction, which is the reverse direction to first direction. During the downward movement of reclaimer boom 8 bulk material 2 is reclaimed from the pile at the storage site 3 until reclaimer boom 8 reaches the lower position.

Fourth, reclaimer boom 8 is rotated about vertical axis 5 by a fourth angle in the first direction of rotation, while reclaimer boom 8 is maintained in the lower position. Preferably, the fourth angle is identical to the second angle.

These steps may be repeated until the pile of bulk material 2 is reclaimed in its entirety.

As can be seen from the drawings, reclaimer boom 8 has a first end portion 8a mounted to the central tower 4 and a second, cantilevered end portion 8b opposite the first end portion 8a. In the lowermost position, as depicted in FIG. 3, the first end portion 8a of reclaimer boom 8 is arranged above second end portion 8b of reclaimer boom 8. In this way, reclaimer boom 8 in the lowermost position extends downwardly from first end portion 8a to second end portion 8b. This construction facilitates the transfer of reclaimed bulk material 2 into the outfeed conveyor 10. In particular, it is not required to provide an intermediate conveyer between conveyor screw 13 on reclaimer boom 8 and outfeed conveyor 10.

Figure 7:
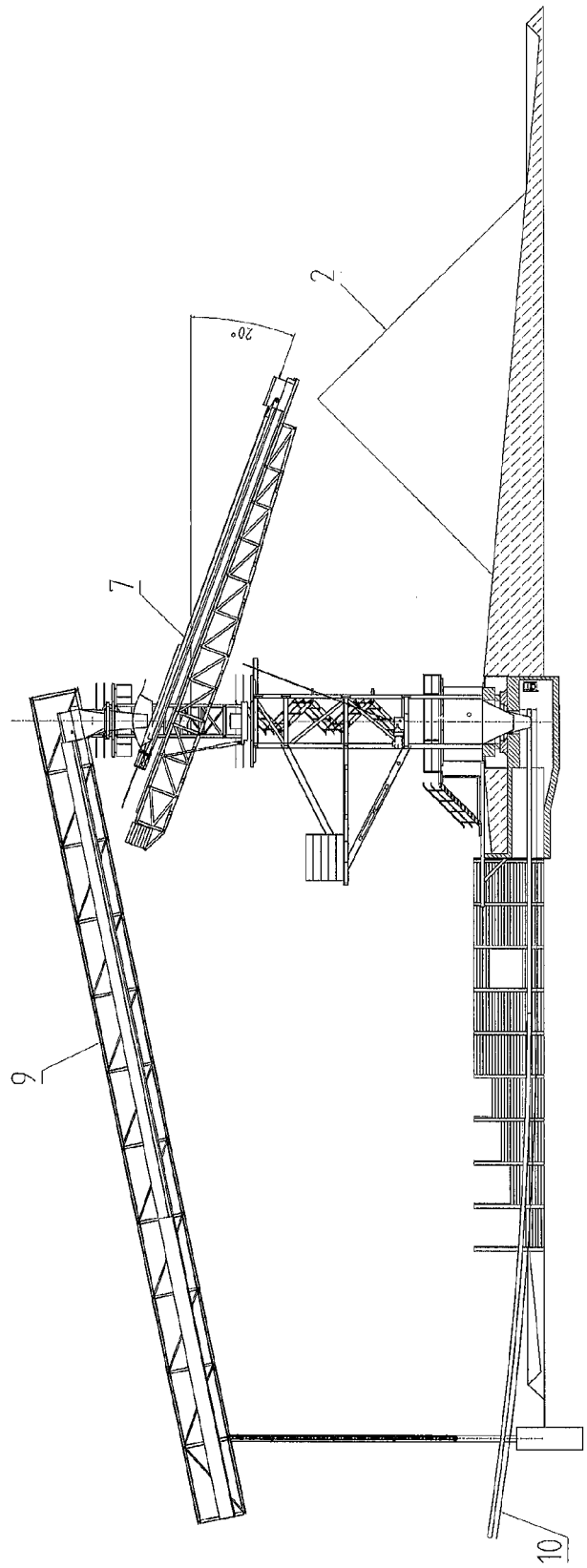
FIG. 7 is a view of the stacker-reclaimer apparatus of FIGS. 1 to 6, with the reclaimer boom in a lower position.

Referring to FIGS. 6 and 7, it can be seen that the stacker boom 7 is pivotably mounted about a horizontal axis on the central tower 4. In this way, stacker boom 7 may be pivoted between an upper position, depicted in FIG. 6, and a lower position, depicted in FIG. 7. In the upper position, stacker boom 7 extends upwardly from the central tower 4. The inclination of stacker boom 7 in the upper position may be approximately 15° with respect to a horizontal layer. In the lower position, stacker boom 7 may extend downwardly from the central tower 4. The inclination of stacker boom 7 in the lower position may be approximately 20° with respect to a horizontal layer.

Figure 8:
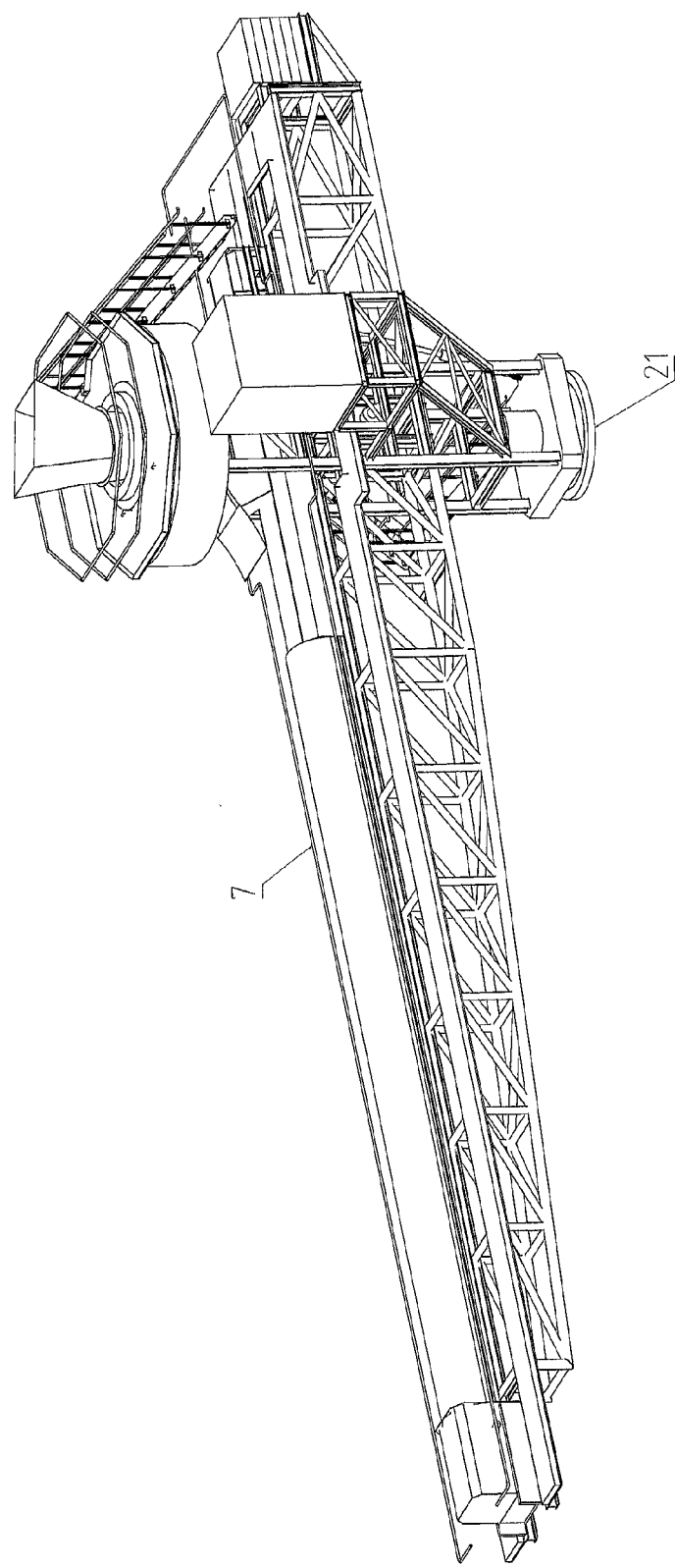
FIG. 8 is a partial view of the stacker-reclaimer apparatus of FIGS. 1 to 7 showing the mounting of the stacker boom on the central tower.

Referring to FIG. 8, it can be seen that stacker boom 7 comprises a slewing bearing 21 for a rotatable mounting of stacker boom 7 on central tower 4.

Although only at least one embodiment of the present invention has been shown and described, it is to be understood that many changes and modifications may be made thereunto without departing from the spirit and scope of the invention.

What is claimed is:

1. A method of reclaiming bulk material from a pile at a storage site comprising the steps of:
    turning a reclaimer boom about a vertical axis of a central tower by a first angle in a first direction and, at the same time,
    hoisting the reclaimer boom from a lower position to an upper position,
    moving the reclaimer boom over a lateral slope of the pile at the storage site, reclaiming bulk material from the lateral slope of the pile, and conveying reclaimed bulk material in a longitudinal direction of the reclaimer boom.

2. The method of claim 1, further comprising the step of turning the reclaimer boom about the vertical axis of the central tower by a second angle in the first direction while the reclaimer boom is arranged in the upper position.

3. The method of claim 2, further comprising the steps of turning the reclaimer boom about the vertical axis of the central tower by a third angle in a second direction opposite to the first direction, and, at the same time, lowering the reclaimer boom from the upper position to the lower position, moving the reclaimer boom over the lateral slope of the pile at the storage site, reclaiming bulk material from the lateral slope of the pile, and conveying reclaimed bulk material in a longitudinal direction of the reclaimer boom.

\* \* \* \* \*